United States Patent [19]

Booker, Jr.

[11] 4,285,163

[45] Aug. 25, 1981

[54] COLLAPSIBLE GROWING PLANT ENCLOSURE

[76] Inventor: William G. Booker, Jr., 217 - 4th Ave., Pleasant Grove, Ala. 35127

[21] Appl. No.: 138,561

[22] Filed: Apr. 8, 1980

[51] Int. Cl.³ .............................................. A01G 9/12
[52] U.S. Cl. ........................................ 47/45; 211/195
[58] Field of Search .................................. 47/44–45; 211/195, 200, 201, 206

[56] References Cited

U.S. PATENT DOCUMENTS

| | | | |
|---|---|---|---|
| 3,113,400 | 12/1963 | Emond | 47/45 |
| 3,559,339 | 2/1971 | Worley | 47/45 |
| 4,073,091 | 2/1978 | Vogel | 47/45 |

FOREIGN PATENT DOCUMENTS 274936 4/1965 Australia .
2739414 2/1979 Fed. Rep. of Germany .

Primary Examiner—Robert E. Bagwill
Attorney, Agent, or Firm—Stevens, Davis, Miller & Mosher

[57] ABSTRACT

A four sided collapsible plant enclosure is described for supporting and maintaining growing plants safe from rodents and other intruders. The structure described includes four sides, each side being hinged to an adjacent side. The hinged sides permit collapsing of the structure for storage. Two adjacent sides of the structure are selected to have a width less than the remaining two adjacent sides of the structure, thereby permitting the enclosure to be collapsed for efficient and safe storage.

4 Claims, 4 Drawing Figures

COLLAPSIBLE GROWING PLANT ENCLOSURE

BACKGROUND OF THE INVENTION

The present invention relates to collapsible enclosures for protecting and supporting growing plants and the like. Specifically, a rigid collapsible four sided enclosure is provided.

The present invention is directed to maintaining growing plants from rodents and other intruders. The structure to which the present invention relates provides for supporting and maintaining the security of growing plants during the growing season with a temporary structure which at the conclusion of a growing season may be collapsed and stored in a safe and efficient way. Such temporary structures must, however, be rigid and sufficiently durable to withstand extreme weather and the attempt by rodents to penetrate the enclosure. For this purpose, the present invention has been developed.

SUMMARY OF THE INVENTION

It is therefore an object of this invention to provide for a rigid enclosure for protecting and supporting growing plants.

It is a further object of the present invention to provide an enclosure which is collapsible to facilitate storage of the enclosure during non-growing seasons.

It is still a further object of the present invention to provide an enclosure which can be manufactured at a minimum cost.

These and other objects are provided by apparatus of the present invention. The present invention provides for a rigid collapsible enclosure suitable for housing growing plants or the like and protecting them from rodents and other physical harm. The present invention is exemplified by a four sided enclosure, each side of the enclosure terminating at an adjacent side. The sides of the enclosure are advantageously hinged to each other to permit the folding of two adjacent sides of the enclosure having a narrow width towards the remaining wider width adjacent sides of the enclosure. The folding of this structure provides for a collapsed structure which may be stored during the non-growing season in a safe manner.

In a preferred embodiment of the invention, each side of the enclosure is formed from a plurality of horizontally extending members which begin at one vertical member and terminate on an adjacent vertical member of another side of the enclosure by means of a hook formed around said adjacent vertical member, thereby forming a hinge with an adjacent side of the structure. The remaining sides similarly form a hinge with an adjacent side by means of a hook member around a vertical member. Additional vertical members may be provided for fixation with the horizontal members forming a side to provide additional security to the protected growing plant.

DESCRIPTION OF THE PREFERRED EMBODIMENT

Figure 1:
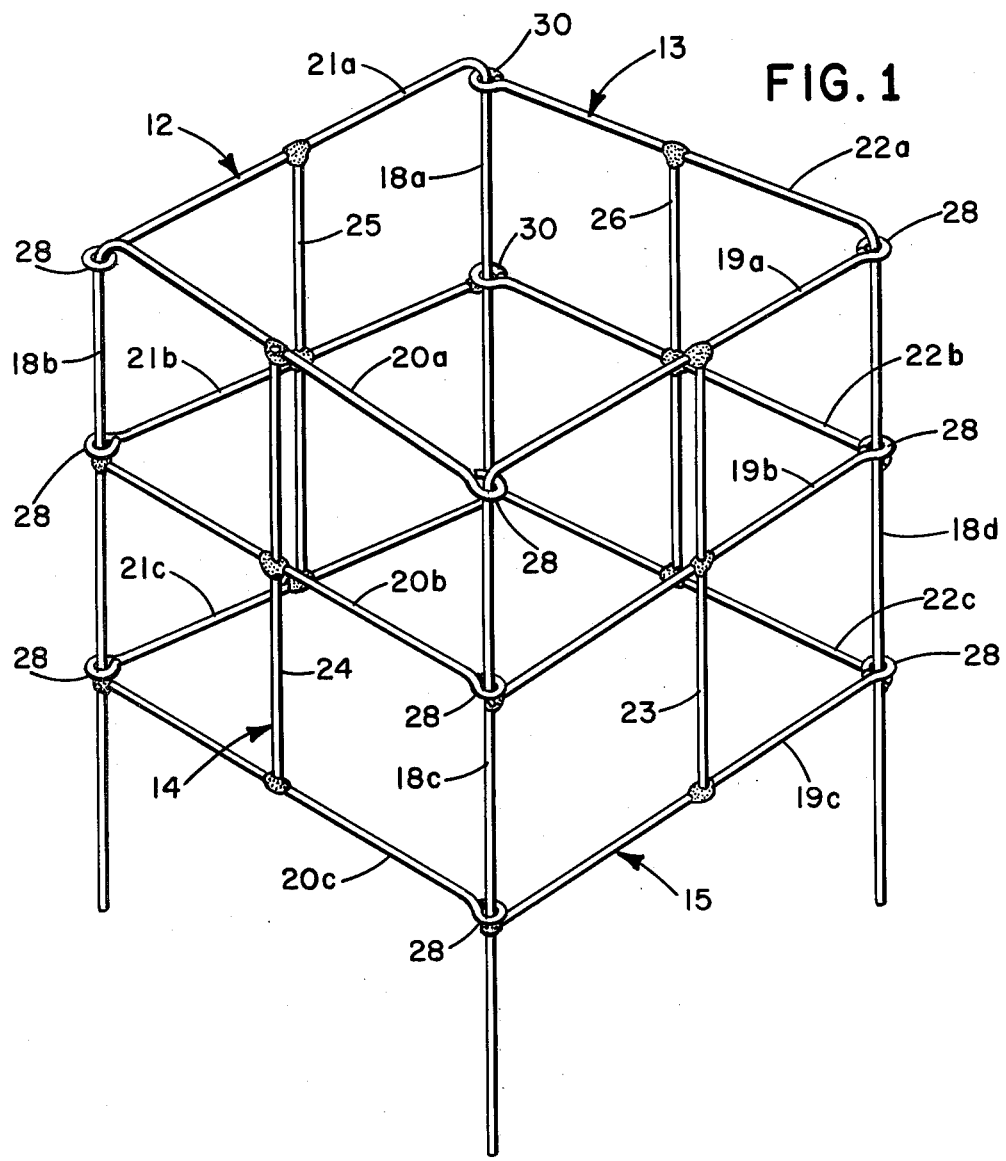
FIG. 1 is a perspective view of a preferred embodiment of an enclosure of the present invention.

Referring now to FIG. 1, there is shown a four sided collapsible enclosure comprising the preferred embodiment of the present invention. The enclosure of FIG. 1 comprises four vertical members 18a, 18b, 18c and 18d which define the four corners of the enclosure. Each of the vertical members 18 has an extended portion for supporting the enclosure above ground.

The four vertical members 18 define the edges of four vertical walls or side members 12, 13, 14 and 15 which are advantageously hinged to each other. The four walls are constructed such that two adjacent walls 12 and 13 are narrower in width than the remaining adjacent walls 14 and 15.

Figure 3:
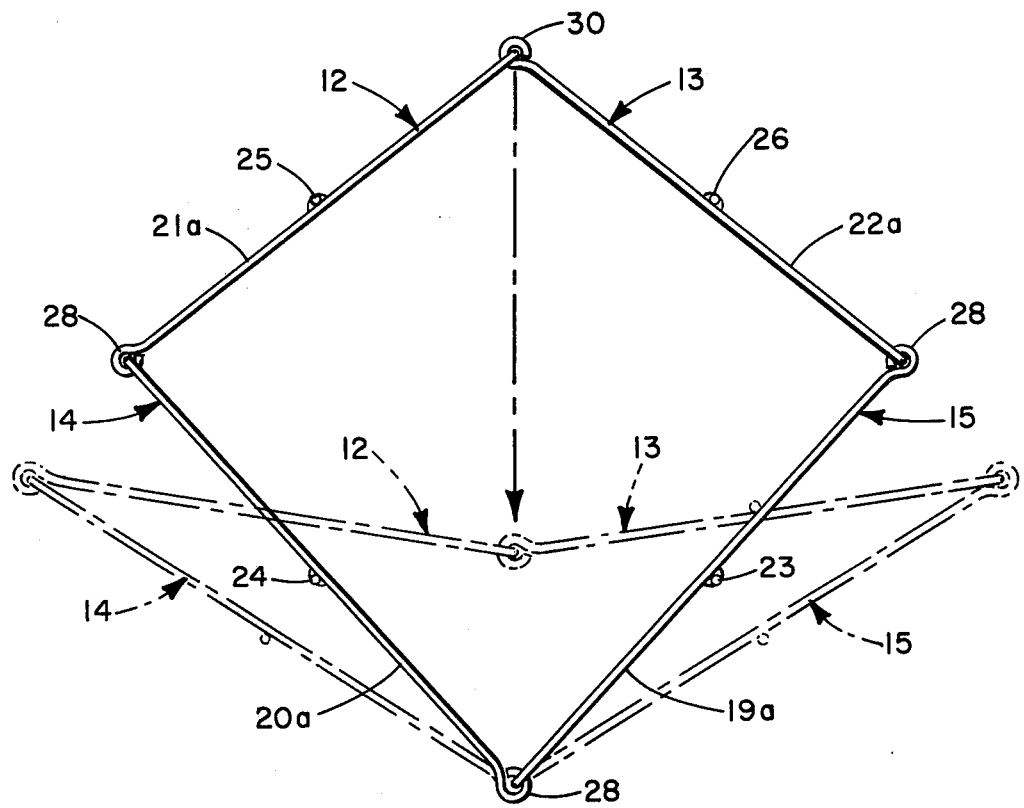
FIG. 3 is a plan view of the enclosure showing the procedure for collapsing the structure of FIG. 1.
Figure 4:
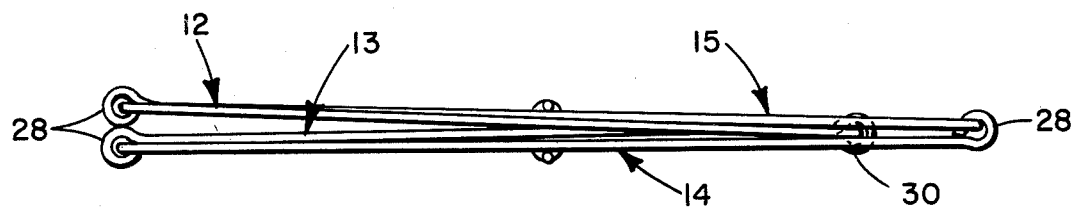
FIG. 4 is a plan view showing the enclosure completely collapsed to permit storage of the enclosure.

The advantages resulting from this relationship can be seen by referring to FIGS. 3 and 4. The narrower walls 12, 13 can be folded towards the wider walls 14, 15 because each wall is hinged to an adjacent wall. By folding the enclosure as shown in FIG. 3 such that narrower walls 12, 13 are in facing relationship with the wider walls 14, 15 permits collapse of the structure as shown in FIG. 4. The collapsed structure may be stored with a minimum of storage space and without damage to the enclosure.

Figure 2:
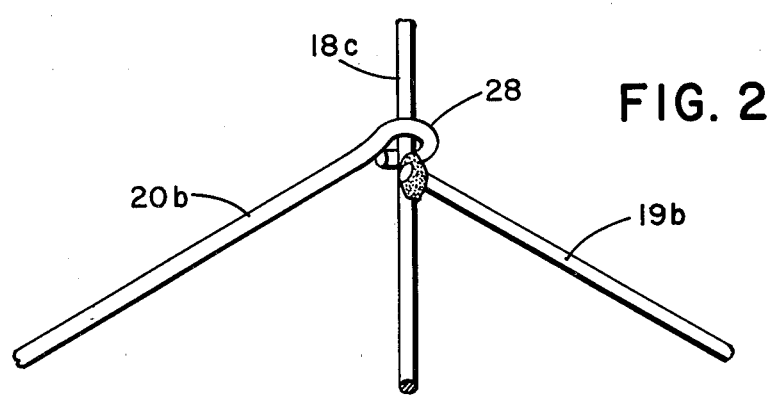
FIG. 2 is a perspective view of a preferred hinge means for connecting adjacent sides of the enclosure of FIG. 1.

The walls in the embodiment are comprised of at least one additional vertical member 23, 24, 25 or 26 welded or by other suitable means fixed to each of three sets of horizontal members 19, 20, 12, 22. The sets of three horizontal members 19, 20, 21, 22 are fixed at one end to a respective vertical member, and terminate in a hook around the next adjacent vertical member. As the figure indicates, the top horizontal members 19a, 20a, 21a, 22a are integral with a vertical member rather than attached thereto. The hook member shown more particularly in FIG. 2 as 28 provides a hinge connection between adjacent sides of the enclosure.

The hooks 30 of side walls 13 are turned opposite to those of the other walls, since this allows the structure to collapse onto a flatter, thinner storage package.

The aforementioned structure provides for rigidity to the enclosure by virtue of the welds between horizontal and vertical members comprising each side. The connection of adjacent sides by the hook member 22 permits the relative folding of the sides with respect to one another as was described with respect to FIGS. 3 and 4.

The above preferred embodiment can be seen to include on each side three adjacent horizontal members 19, 21 and 22. Those skilled in the art will recognize, however, that the invention may be constituted such that more or less vertical and horizontal members may be included on a side of the enclosure to permit a more or less secure enclosure to be realized, depending upon the particular application.

The preceeding illustration is one example of many which those skilled in the art will recognize of the invention defined more particularly by the claims which follow.

What is claimed is:

1. A collapsible protective enclosure for growing plants comprising:
   four adjacent hinge-connected screens forming a four sided enclosure, each of said screens comprising at least two vertical members rigidly fastened to at least three horizontal members, said horizontal members terminating in hinges formed of a hook around a vertical member of an adjacent screen;

a first pair of adjacent screens of said enclosure having a width less than the width of the remaining pair of adjacent screens, whereby said first pair of screens may be folded towards the interior surface of said remaining pair of screens permitting the collapse of said enclosure.

2. The enclosure of claim 1, wherein certain vertical members of each screen have a length permitting the enclosure to be fixed to a plant growing surface.

3. A collapsible plant enclosure comprising four vertical members defining the corners of a four sided enclosure; at least two horizontal wires beginning at each vertical member and terminating in a hook around an adjacent vertical member for forming four hinged sides, said vertical members being positioned such that a first pair of adjacent sides of said enclosure are formed having a width less than the width of the remaining pair of adjacent sides, the hooks joining said remaining pair of adjacent sides being bent in a direction opposite to the direction of the hooks forming the remaining hinges, whereby said enclosure may be collapsed by moving the first pair of adjacent sides towards the remaining pair of adjacent sides.

4. A collapsible protective enclosure comprising four hinged planar vertically positioned sides enclosing a perimeter, two adjacent sides having a narrower width than the width of the remaining of said sides, whereby said enclosure may be collapsed by folding said narrower adjacent sides towards said wider adjacent sides, each of said sides comprising at least one vertical member and a plurality of substantially parallel horizontal members beginning at said vertical member and fixed thereto and extending horizontally terminating in a hook around a vertical member of an adjacent side and forming a hinge therewith, the direction of the hook joining said sides have a narrower width being opposite to those connecting the remaining sides.

* * * * *